US006263666B1

United States Patent
Kubo et al.

(10) Patent No.: US 6,263,666 B1
(45) Date of Patent: Jul. 24, 2001

(54) EXHAUST EMISSION CONTROL DEVICE FOR INTERNAL COMBUSTION ENGINE

(75) Inventors: Kengo Kubo, Yokohama; Yasuji Ishizuka, Chigasaki; Kimiyoshi Nishizawa, Yokohama, all of (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 09/527,511

(22) Filed: Mar. 16, 2000

(30) Foreign Application Priority Data

Mar. 18, 1999 (JP) .................................................. 11-073319

(51) Int. Cl.[7] ....................................................... F01N 3/00
(52) U.S. Cl. .................................. 60/277; 60/295; 60/301
(58) Field of Search ............................... 60/277, 295, 300, 60/301

(56) References Cited

U.S. PATENT DOCUMENTS

| 5,426,934 | * | 6/1995 | Hunt et al. ............................. 60/277 |
| 5,472,673 | * | 12/1995 | Goto et al. ............................. 60/297 |
| 5,564,283 | * | 10/1996 | Yano et al. ............................. 60/285 |
| 5,771,686 | * | 6/1998 | Pischinger et al. ..................... 60/301 |
| 5,778,666 |   | 7/1998 | Cullen et al. .......................... 60/274 |
| 6,014,859 | * | 1/2000 | Yoshizaki et al. ...................... 60/285 |
| 6,058,700 | * | 5/2000 | Yamashita et al. ...................... 60/285 |
| 6,119,450 | * | 9/2000 | Boegner et al. ........................ 60/285 |

FOREIGN PATENT DOCUMENTS

| 197 31 624 | | 1/1999 | (DE) . |
| 580389 | * | 1/1994 | (EP) . |
| 0 860 595 | | 8/1998 | (EP) . |
| 7-217474 | | 8/1995 | (JP) . |
| 98/12423 | | 3/1998 | (WO) . |

* cited by examiner

Primary Examiner—Thomas Denion
Assistant Examiner—Diem Tran
(74) Attorney, Agent, or Firm—Foley & Lardner

(57) ABSTRACT

An exhaust emission control device of an engine 1 comprises an NOx storage catalyst 9 which traps and stores NOx in exhaust gas and reduces the stored NOx according to an air fuel ratio of inflowing exhaust gas. A controller 6 determines conditions for discharging the SOx stored in the catalyst 9. When SOx discharge conditions are satisfied and the engine running conditions are in a predetermined SOx discharge running region, the controller 6 performs SOx discharge control of the catalyst 9. As lean air fuel ratio control is prohibited from when SOx discharge conditions are satisfied to when SOx discharge is complete, lean air fuel ratio control is prevented from taking place when the NOx trapping capacity of the catalyst 9 is insufficient, and increase of exhaust emission is thereby prevented.

2 Claims, 7 Drawing Sheets

EXHAUST EMISSION CONTROL DEVICE FOR INTERNAL COMBUSTION ENGINE

FIELD OF THE INVENTION

The present invention relates to an exhaust emission control device of an internal combustion engine.

BACKGROUND OF THE INVENTION

A NOx storage catalyst which traps NOx (nitrogen oxides) in exhaust gas is used in the exhaust emission control device of an internal combustion engine.

The NOx storage catalyst traps and stores NOx in the exhaust gas when the air-fuel ratio of the inflowing exhaust gas is lean. When the engine is run at a rich or stoichiometric air fuel ratio, the stored NOx is reduced by components such as HC and CO in the exhaust gas.

However, SOx (sulfur oxide) is trapped by this NOx storage catalyst, too, and is stored. Therefore, the ability to trap NOx of an NOx storage catalyst falls when the amount of stored SOx increases (SOx poisonings).

In this regard, the exhaust emission control device disclosed in Tokkai Hei 7-217474 published by the Japanese Patent office in 1995 discloses a method wherein the SOx amount stored in the NOx storage catalyst provided in an exhaust pipe is estimated, and when the estimated SOx storage amount exceeds a permitted value, the exhaust gas flowing into the NOx storage catalyst is lean or at the stoichiometric air fuel ratio and catalyst temperature is higher than a predetermined temperature, the air-fuel ratio of the exhaust gas flowing into the catalyst is temporarily made rich, and stored SOx is discharged.

SUMMARY OF THE INVENTION

In the aforesaid device when the SOx storage amount is above a permitted value and catalyst temperature is lower than the predetermined temperature, the ignition timing is delayed to raise the catalyst temperature. However, when the catalyst temperature does not reach the predetermined temperature even if the ignition timing is delayed, retardation of ignition timing is stopped and lean air-fuel ratio operation is resumed.

Therefore, the vehicle may run at a lean air fuel ratio although the SOx storage amount in the NOx storage catalyst exceeds the permitted value and the NOx trapping capacity is low. The amount of NOx which passes through the NOx storage catalyst without being trapped then increases, and exhaust emissions increase.

In addition, in tee aforesaid device, no consideration was given to permanent deterioration of the NOx catalyst such as heat deterioration which leads to decrease of NOx trapping capacity as in the case when the SOx storage amount increased. Therefore, SOx discharge control is performed when the catalyst has permanently deteriorated and NOx trapping capacity does not return even if SOx discharge control is performed. This is detrimental to fuel economy.

It is therefore an object of the present invention to prevent increase of exhaust emissions and impairment of fuel economy when the NOx trapping capacity of an NOx storage catalyst decreases due to SOx poisoning or permanent deterioration, in an exhaust emission control device which performs discharge control of SOx stored in the NOx storage catalyst.

In order to achieve above object, this invention provides an exhaust emission control device for an engine comprising an exhaust pipe, a catalyst provided in the exhaust pipe which traps and stores NOx in exhaust gas and reduces the stored NOx according to an air-fuel ratio of the exhaust gas flowing into the catalyst, and a microprocessor programmed to determine whether or not conditions for discharging SOx stored in the catalyst are satisfied, raise the temperature of the catalyst to discharge SOx when SOx discharge conditions are satisfied and the running conditions of the engine are in a predetermined SOx discharge running region, and prohibit lean air fuel ratio running of the engine from when SOx discharge conditions are satisfied to when SOx discharge is complete.

The details as well as other features and advantages of this invention are set forth in the remainder of the specification and are shown in the accompanying drawings.

BRIEF DESCRIPTION OF TEE DRAWINGS

DESCRIPTION OF THE PREFERRED EMBODIMENTS

Figure 1:
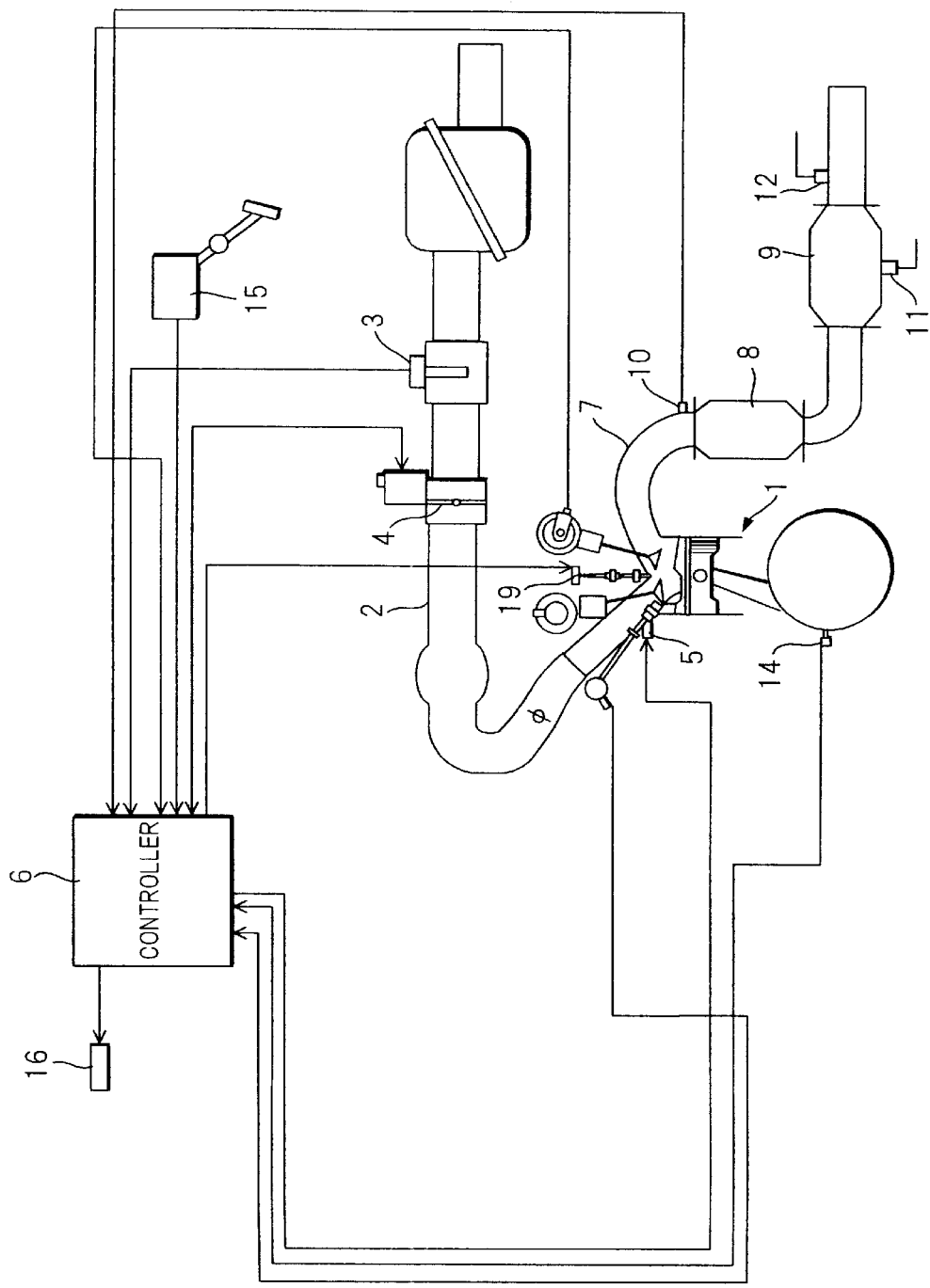
FIG. 1 is a schematic diagram of an engine exhaust emission control device according to this invention.

Referring to FIG. 1 of the drawings, an inlet pipe 2 of an internal combustion engine 1 is provided with an air flow meter 3 which detects an intake air amount, and a throttle 4 which adjusts the intake air amount. A front catalyst 8 is provided in an exhaust pipe 7 of the engine 1, and a rear catalyst 9 is provided downstream of the front catalyst 8.

The front catalyst 8 is a three-way catalyst, and performs reduction of NOx in the exhaust gas and oxidation of HC and CO with maximum conversion efficiency when the air-fuel ratio of the inflowing exhaust gas has a stoichiometric air-fuel ratio.

The rear catalyst 9 has a function to oxidatively reduce HC, CO and NOx in the exhaust gas at the stoichiometric air fuel ratio, and a function to trap and store NOx in the exhaust gas at a lean air fuel ratio and reduce the stored NOx at a rich air fuel ratio.

An oxygen sensor 10 is provided upstream of the front catalyst 8. The oxygen sensor 10 detects whether the air-fuel ratio of the exhaust gas flowing into the front catalyst 8 is richer or leaner than gas having a stoichiometric air-fuel ratio.

The rear catalyst 9 is provided with a catalyst temperature sensor 11 which detects the temperature of the rear catalyst 9. An NOx sensor 12 which detects the NOx concentration in the exhaust gas is provided downstream of the rear catalyst 9.

A controller 6 comprises a central processing unit, read only memory, random access memory and I/O interface. Signals from the above-mentioned air flow meter 3, oxygen sensor 10, catalyst temperature sensor 11 and NOx sensor 12 are input into the controller 6. In addition, a cooling water temperature signal from a cooling water temperature sensor, Ref signal and Pos signal from a crank angle sensor 14, and accelerator pedal depression signal from an accelerator position sensor 15, are input into the controller 6. The controller 6 controls the above-mentioned throttle 4, injector 5 and an ignition plug 19 based on these various signals.

The SOx in the exhaust gas is also trapped and stored by the rear catalyst 9. If the SOx amount stored in the rear catalyst 9 increases, the NOx trapping capacity of the rear catalyst 9 decreases.

Therefore, when the SOx amount stored in the rear catalyst 9 exceeds a predetermined amount, SOx discharge control is performed and the stored SOx is discharged. During the time from when the SOx amount stored in the rear catalyst 9 exceeds the predetermined amount to when SOx discharge control is completed, the NOx trapping capacity of the rear catalyst 9 is insufficient, so the controller 6 prohibits lean air fuel ratio running which would increase the NOx discharge amount.

In addition, based on the output of the NOx sensor 12, the controller 6 detects the NOx storage capacity of the rear catalyst 9 (amount of NOx which the rear catalyst 9 can store). When it is determined that the rear catalyst 9 has permanently deteriorated due to thermal deterioration based on the detected NOx storage capacity, lean air-fuel ratio running of the engine 1 is prohibited.

When the rear catalyst 9 has permanently deteriorated and the NOx storage capacity has decreased, the air fuel ratio must be made rich immediately to reduce stored NOx even if lean air fuel ratio running is being performed, so when the rear catalyst 9 has permanently deteriorated, lean air fuel ratio running is prohibited and the air fuel ratio is prevented from being changed over frequently.

Furthermore, when the rear catalyst 9 has permanently deteriorated, the NOx trapping capacity of the rear catalyst 9 does not recover even if SOx discharge control is performed, so SOx discharge control is also prohibited, and SOx discharge control is prevented from being performed needlessly.

Figure 2:
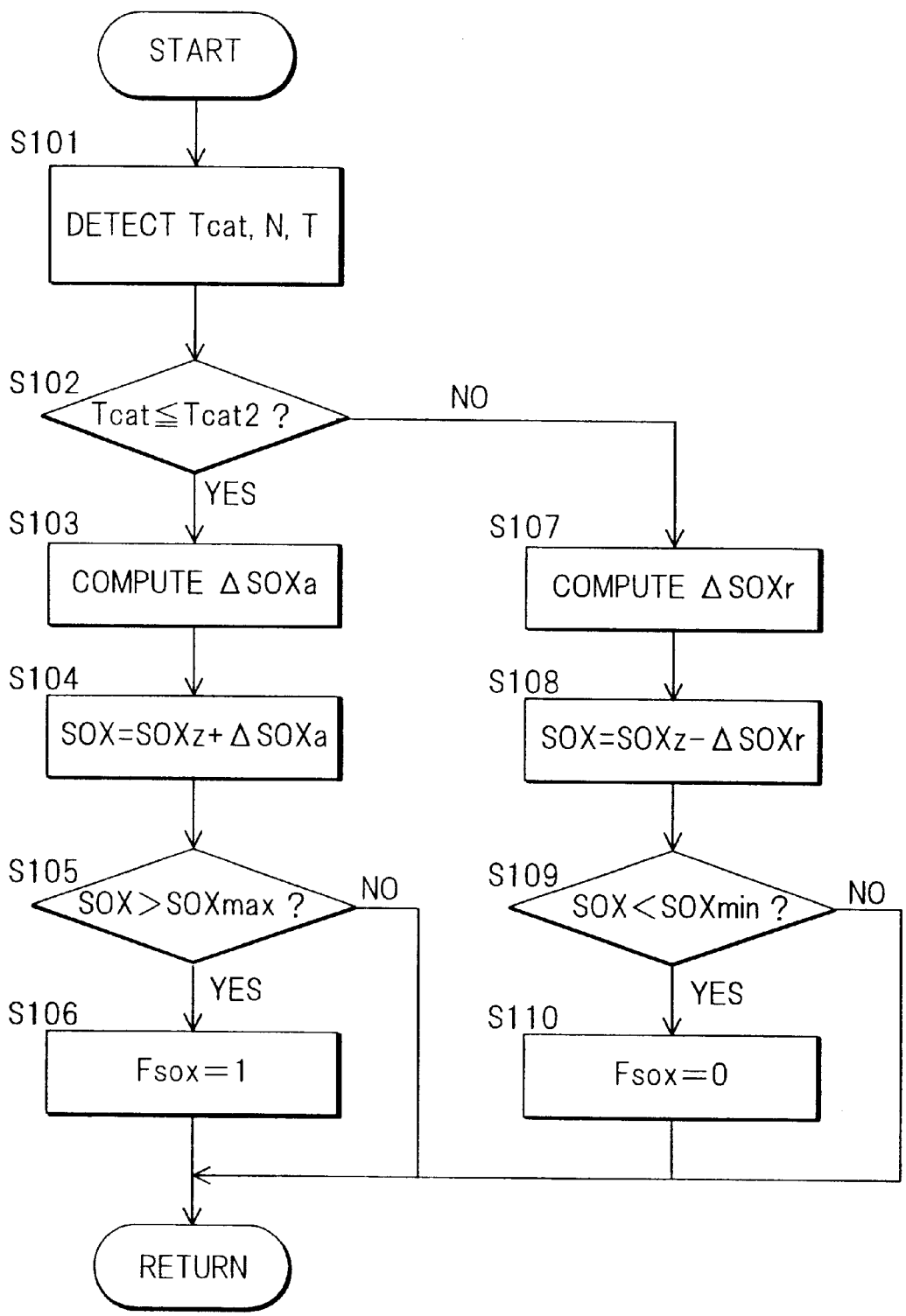
FIG. 2 shows a routine for determining whether or not SOx discharge conditions are satisfied.

FIG. 2 shows a routine for determining whether or not SOx discharge conditions are satisfied. This routine is performed by the controller 6 at a predetermined interval, for example 10 milliseconds.

This routine estimates the SOx amount stored in the rear catalyst 9. Based on the estimated SOx storage amount, it is determined whether or not SOx release conditions are satisfied, and a flag Fsox is set.

First, in a step S101, the output of the catalyst temperature sensor 11 is A/D converted, and the catalyst temperature Tcat of the rear catalyst 9 is detected. The engine rotation speed N is calculated based on a recurrence interval of a signal (for example, Ref signal) from the crank angle sensor 14. An engine load T (for example, target torque of the engine 1 according to an accelerator depression amount) is also calculated based on the output of the accelerator position sensor 15.

In a step S102, it is determined whether or not the catalyst temperature Tcat is lower than an SOx discharge temperature Tcat2. When the catalyst temperature Tcat is less than the SOx discharge temperature Tcat2, it is determined that conditions for the rear catalyst 9 to tap SOx are satisfied, and the routine proceeds to a step S103. On the other hand, when the catalyst temperature Tcat is higher than the SOx discharge temperature Tcat2, it is determined that conditions for the rear catalyst 9 to discharge SOx are satisfied, and the routine proceeds to a step S107.

In the step S103, the SOx amount trapped in a predetermined time (here 10 milliseconds) by the rear catalyst 9 is computed by the following equation:

$$\Delta SOXa = (SOx\ amount\ which\ flows\ into\ the\ rear\ catalyst\ 9\ in\ a\ predetermined\ time) \times (SOx\ trapping\ rate\ of\ rear\ catalyst\ 9) \quad (1)$$

The SOx amount which flows into the rear catalyst 9 in a predetermined time is computed based on, for example, the engine rotation speed N, engine load T and average air-fuel ratio. The SOx trapping rate of the rear catalyst 9 (SOx amount trapped per predetermined time/SOx amount flowing in per predetermined time) is computed based on, for example, the present SOx storage amount SOXz (estimated value of SOx storage amount computed on the immediately preceding occasion), catalyst temperature Tcat and average air-fuel ratio. A target equivalence ratio TFBYA set by a routine described later is for example used as the average air-fuel ratio.

The SOx trapping rate of the rear catalyst 9 is a value ranging from zero to 1, and has the following characteristics.

The SOx trapping rate increases as the SOx storage amount SOX of the rear catalyst 9 decreases. When the SOx storage amount SOX is zero, the SOx trapping rate is a maxinum.

The SOx trapping rate is a maximum when the temperature Tcat of the rear catalyst 9 is a predetermined temperature, is smaller when the temperature is lower than the predetermined temperature, and is zero below the catalyst activation temperature. The SOx trapping rate decreases even at a temperature higher than the predetermined temperature, and is zero above the SOx discharge temperature Tcat2.

The SOx trapping rate decreases with decreasing levels of leanness, and becomes zero at a rich air fuel ratio.

When the SOx amount $\Delta SOXa$ trapped in a predetermined time has been computed, the routine proceeds to a step S104.

In the step S104, $\Delta SOXa$ is added to the estimated SOx storage amount SOXz computed on the immediately preceding occasion, and the newest estimated SOx storage amount SOX is computed.

In a step S105, it is determined whether or not the estimated SOx storage amount SOX is larger than a permitted value SOXmax. When the estimated SOx storage amount SOX is greater than the predetermined amount SOXmax, the routine proceeds to a step S106, and the flag Fsox is set to 1 showing that SOx discharge conditions are satisfied. The predetermined value SOXmax is set so that a predetermined NOx storage capacity NOXth remains in the rear catalyst 9.

On the other hand, in a step S107, an SOx amount $\Delta SOXr$ discharged from the rear catalyst 9 in a predetermined time (here 10 milliseconds) is computed by the following equation:

$$\Delta SOXr = (predetermined\ time) \times (SOx\ discharge\ rate\ of\ rear\ catalyst\ 9) \quad (2)$$

The SOx discharge rate of the rear catalyst 9 is the SOx amount discharged per predetermined time, and is computed based on, for example, the present SOx storage amount SOXz (estimated value of SOx storage amount computed on the immediately preceding occasion), catalyst temperature Tcat and average air-fuel ratio.

The target equivalence ratio TFBYA set by a routine described later is used as the average air-fuel ratio. However, during SOx discharge control, as it may occur that the average air-fuel ratio may be made rich by varying the control center value of air-fuel ratio feedback control while setting TFBYA=, the degree of richness must also be taken into account.

The SOx discharge rate of the rear catalyst 9 has the following characteristics.

The SOx discharge rate decreases as the SOx storage amount SOX of the rear catalyst 9 decreases. When the SOx storage amount SOX is zero, the SOx discharge rate is zero.

The SOx discharge rate decreases as the catalyst temperature Tcat of the rear catalyst 9 decreases, and becomes zero below the SOx discharge temperature Tcat2.

The SOx discharge rate decreases as the degree of richness decreases, and becomes zero at a lean air fuel ratio.

After the SOx amount discharged from the rear catalyst ΔSOXr is computed, the routine proceeds to a step S108, and ΔSOXr is subtracted from the estimated SOx storage amount SOXz computed on the immediately preceding occasion to estimate the newest SOx storage amount SOX.

In a step S109, it is determined whether or not the estimated SOx storage amount SOX is smaller than a predetermined value SOXmin. When it is smaller than the predetermined value SOXmin, the routine proceeds to a step S110, and the flag Fsox is set to zero showing that SOx discharge conditions are not satisfied. The predetermined value SOXmin is set to a small value near zero.

Therefore, by performing this routine, the trapped SOx amount ΔSOXa or discharge amount ΔSOXr of the rear catalyst 9 per predetermined time is computed based on the catalyst temperature Tcat, and the SOx storage amount SOX is estimated by accumulating these values.

Once this estimated SOx storage amount SOX exceeds the permitted amount SOXmax, Fsox=1 is maintained until SOx is almost completely discharged. The reason why Fsox=1 is maintained until SOx is almost completely discharged is to prevent frequent starts and stops of SOx discharge control.

The SOx stored in the rear catalyst 9 is stored by the rear catalyst 9 as it is even after the engine 1 stops, so the estimated SOx storage amount SOX remains in the memory of the controller 6 even after the engine stops. It is read as an initial value of the SOx storage amount SOX the next time the engine starts, and is used for subsequent estimations of the SOx storage amount SOX.

Here, the SOx storage amount SOX is estimated by performing a cumulative computation on the SOx trapping amount SOXa and discharge amount SOXr per predetermined time, but this may be simplified. For example, the steps S103, S107 may be omitted and ΔSOXa, ΔSOXr may be taken as fixed values in the steps S104, S108.

In addition, this routine is executed at a predetermined interval (for example, 10 milliseconds), but as trapping and discharge of SOx take place relatively slowly, the routine may be performed at an interval of 1 second or 10 seconds.

Figure 3:
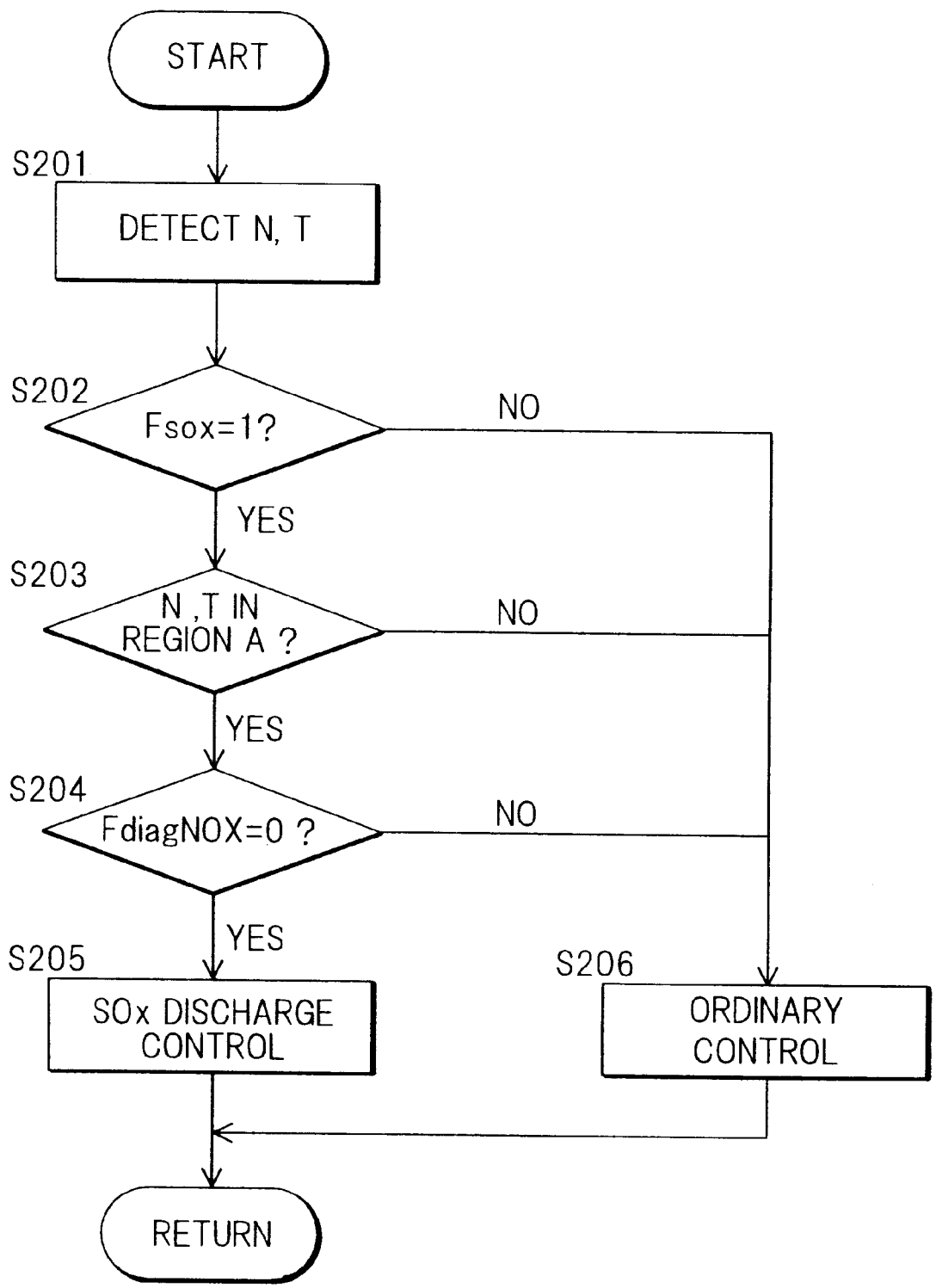
FIG. 3 shows the routine for determining whether or not to perform SOx discharge control.

FIG. 3 shows the routine for determining whether or not SOx discharge conditions are satisfied. This routine is performed by the controller 6 at a predetermined interval, for example 10 milliseconds.

This routine determines whether or not to perform SOx discharge control from the rear catalyst 9 based on the flag Fsox, running conditions and a flag FdiagNOx set by a routine described later.

First, in a step S201, the engine rotation speed N is detected based on the recurrence interval of a predetermined signal of the crank angle sensor 14. The engine load T is also detected based on the output of the accelerator position sensor 15.

In a step S202, it is determined whether or not conditions for discharge of SOx stored in the rear catalyst 9 are satisfied based on the flag Fsox. When the SOx discharge conditions are satisfied (Fsox=1), the routine proceeds to a step S203, otherwise the routine proceeds to a step S206 and ordinary control is performed.

Figure 4:
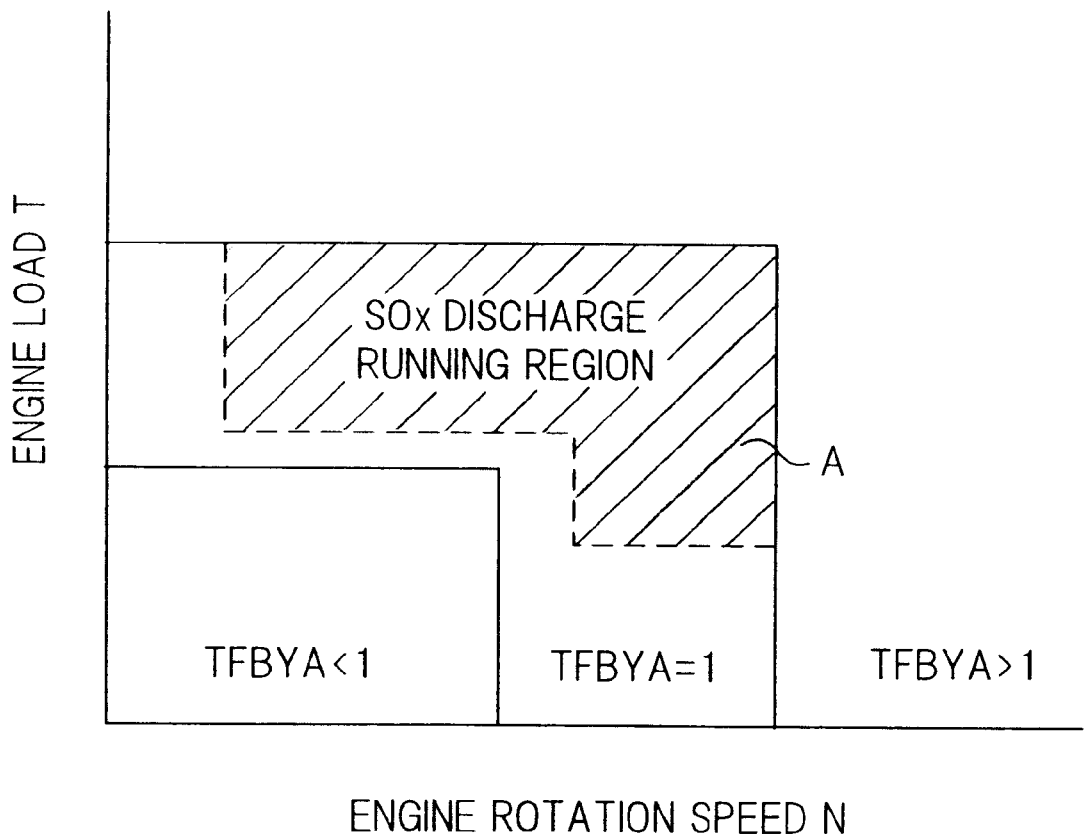
FIG. 4 is a map used for setting a target equivalence ratio.

In a step S203, it is determined whether or not the engine rotation speed N and engine load T are in an SOx discharge running region by looking up a map shown in FIG. 4. When they are in the SOx discharge running region, the routine proceeds to a step S204, otherwise the routine proceeds to a step S206 and ordinary control is performed.

Here, the SOx discharge running region is the region shown by the shaded part of FIG. 4, and it is a region wherein the catalyst temperature Tcat of the rear catalyst 9 can be raised above the SOx discharge temperature Tcat2 when SOx discharge control is performed.

In the step S204, it is determined whether or not the rear catalyst 9 has deteriorated based on the flag FdiagNOX. The flag FdiagNOX is set by a routine described later, and is set to 1 when the rear catalyst 9 has permanently deteriorated due to heat deterioration, etc.

When the rear catalyst has permanently deteriorated (FdiagNOX=1), the NOx storage capacity cannot return to greater capacity even if SOx discharge control is performed, so the routine proceeds to a step S206, and ordinary control is performed according to the running conditions at that time (prohibition of SOx discharge control).

On the other hand, when the rear catalyst 9 has not permanently deteriorated (FdiagNOX=0), the routine proceeds to a step S205 and SOx discharge control is performed. During SOx discharge control, in order to raise catalyst temperature, for example, the combustion of the engine 1 is controlled to raise exhaust gas temperature, or a misfire is caused to increase the amount of fuel and oxygen flowing into the rear catalyst 9 and thereby increase oxidation reactions on the rear catalyst 9. Alternatively, the rear catalyst 9 is directly heated by a heater.

Due to this, SOx which was stored in the rear catalyst 9 is discharged, the air-fuel ratio is made rich by a routine described later, and the discharged SOx is reduced.

Therefore, by performing this routine, if SOx discharge conditions are satisfied, the running conditions are in the SOx discharge running range and the rear catalyst 9 has not permanently deteriorated, SOx discharge control is performed. However, if even one of these conditions does not hold, ordinary control is performed.

In particular, when the rear catalyst 9 has permanently deteriorated and recovery of NOx trapping capacity cannot be expected even if SOx discharge control is performed, SOx discharge control is not performed. Consequently, SOx discharge control is not performed needlessly, and impairment of fuel economy or increase of exhaust emissions is prevented.

Figure 5:
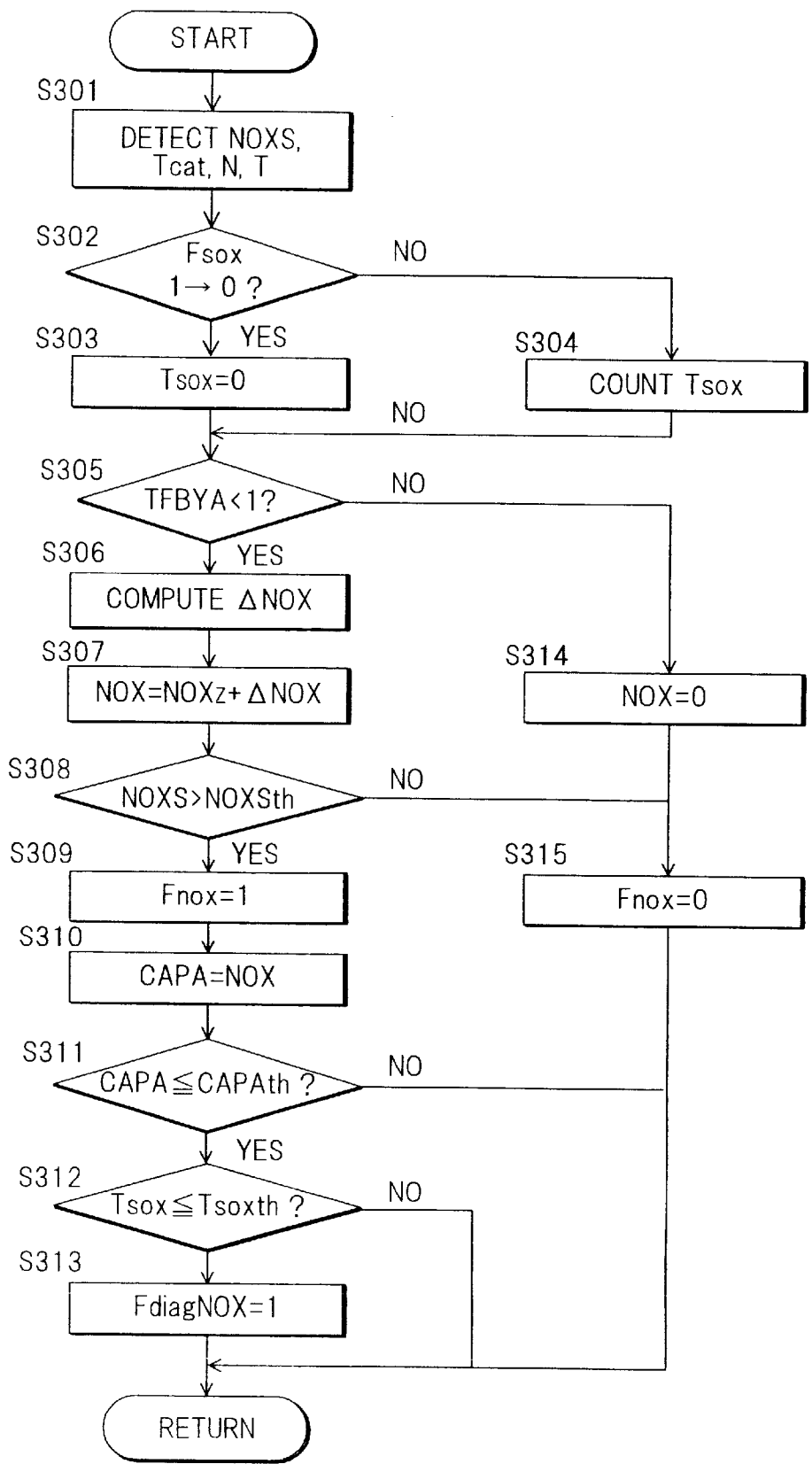
FIG. 5 shows a routine for determining permanent deterioration of a catalyst.

FIG. 5 shows a routine for determining permanent deterioration of the rear catalyst 9. This routine is performed at a predetermined interval, for example 10 milliseconds, by the controller 6.

In this routine, the NOx storage capacity (total amount of NOx that can be trapped) of the rear catalyst 9 is detected based on the NOx concentration flowing out from the rear catalyst 9, it is determined whether or not the rear catalyst 9 has permanently deteriorated based on the detected NOx storage capacity, and the flag FdiagNOX is set.

First, in a step S301, the output of the NOx sensor 12 is A/D converted, and an NOx concentration NOXS is found. The engine rotation speed N is also found based on the occurrence interval of a predetermined signal of the crank angle sensor 14. The engine load T is found based on the output of the accelerator position sensor 15.

In a step S302, is determined whether or not it is immediately after SOx discharge control based on the variation of the flag Fsox. When the immediately preceding value of the flag Fsox is 1 (SOx discharge conditions are satisfied) and the present value is zero (SOx discharge conditions are not satisfied), it is determined that it is immediately after SOx discharge control has terminated and the routine proceeds to a step S303.

In the step S303, a counter Tsox is reset to zero to measure the elapsed time from when SOx discharge control has terminated. On the other hand, when it is determined that it is not immediately after SOx discharge control has terminated, the routine proceeds to a step S304, and the counter Tsox is counted.

In a step S305, it is determined whether or not the air fuel ratio is controlled to lean based on the target equivalence ratio TFBYA set in a routine described later. When the air fuel ratio is controlled to lean (TFBYA<1), the routine proceeds to a step S306, otherwise the routine proceeds to a step S314.

In the step S306, the NOx amount ΔNOX trapped by the rear catalyst 9 in a predetermined time Mere, 10 milliseconds) is computed from the following equation:

ΔNOX=(NOx amount flowing into rear catalyst 9 in a predetermined time)×(NOx trapping rate of rear catalyst 9)   (3)

The NOx amount flowing into the rear catalyst 9 per predetermined time is computed based on the engine rotation speed N, engine load T and average air fuel ratio. The target equivalence ratio TFBYA may be used as the average air fuel ratio.

The NOx trapping rate of the rear catalyst 9 is a value from zero to 1, and has the following characteristics.

The NOx trapping rate increases the larger the difference between the NOx storage capacity of the rear catalyst 9 and the present NOx storage capacity, i.e., the larger the amount left up to the NOx storage capacity the NOx trapping rate is a maximum when the catalyst temperature Tcat of the rear catalyst 9 is a predetermined temperature. It decreases the lower the predetermined temperature, and is zero below the catalyst activation temperature. It also decreases the higher the temperature above the predetermined temperature.

The NOx trapping rate decreases as the degree of leanness decreases, and becomes zero at a rich air-fuel ratio.

In a step S307, ΔNOX is added to the NOx storage amount NOXz estimated on the immediately preceding occasion to estimate the newest NOx storage amount NOX.

In a step S308, it is determined whether or not the NOx concentration NOXS is greater than a predetermined value NOXSth. When it is greater than the predetermined value NOXSth, the routine proceeds to a step S309 to perform NOx discharge control, otherwise the routine proceeds to a step S315, and a flag Fnox is set to zero showing that NOx is discharged control is not performed.

In other words, determination of whether or not the NOx storage amount has increased, the NOx trapping rate has decreased and NOx spillover has exceeded the predetermined limits is made based on the NOx concentration NOX downstream of the rear catalyst 9.

In view of the fact that the NOx trapping rate is affected by the catalyst temperature and the air fuel ratio in addition to the present NOx storage amount, and that the NOx spillover amount increases the larger the NOx amount flowing into the rear catalyst 9 per predetermined time even at the same NOx trapping rate, the predetermined value NOXSth may be varied according to the engine rotation speed N, engine load T, catalyst temperature Tcat and the air fuel ratio.

In a step S309, the flag Fnox is set to 1 showing that conditions for reducing the NOx stored in the rear catalyst 9 are satisfied, control is performed to temporarily set the air fuel ratio to rich by an air fuel ratio control routine, not shown, and the stored NOx is reduced.

In a step S310, the NOx storage amount NOX when the NOx spillover from the rear catalyst 9 has exceeded the predetermined value, is memorized as a present NOx storage capacity CAPA of the rear catalyst 9. The NOx storage capacity CAPA decreases as the SOx storage amount increases, and also decreases as the heat deterioration of the rear catalyst 9 progresses.

In a step S311, it is determined whether or not an NOx storage capacity CAPAth, which can expect a sufficient advantage when lean air fuel ratio running is performed, remains in the rear catalyst 9 based on the NOx storage capacity CAPA.

When the NOx storage capacity CAPA decreases, even if lean air fuel ratio running is performed, the air fuel ratio is more frequently changed to rich to reduce NOx, and the improvement in fuel economy due to lean air fuel ratio running decreases. Further, the frequent change-over of the air fuel ratio leads to an increase of exhaust emissions.

Therefore, in the step S311, it is determined whether or not the NOx storage capacity CAPA is less than the determined capacity CAPAth. When it is less than the determined capacity CAPAth, the routine proceeds to a step S312, otherwise the routine is terminated.

In the step S312, it is determined whether or not an elapsed time Tsox from when the SOx discharge control has terminated, is less than the predetermined time Tsoxth. When it is less than the predetermined time Tsoxth, the routine proceeds to a step S313, otherwise the routine is terminated. The predetermined time Tsoxth is set to a time such that the effect on the NOx storage capacity CAPA can practically be ignored even if SOx trapping is performed to the maximum extent during this interval.

Therefore, when the NOx storage capacity CAPA is less than the capacity CAPAth, even if the elapsed time Tsox has not reached the predetermined time Tsoxth after SOx discharge control has terminated, the routine proceeds to the step S313.

In this case, the NOx storage capacity CAPA has probably decreased to less than the predetermined determination capacity CAPAth due only to permanent deterioration such as heat deterioration, so the flag FdiagNOX is set to 1 showing that the rear catalyst 9 has permanently deteriorated. In this case, a warning lamp 16 may be lit to warn the driver that the NOx trapping capacity of the rear catalyst 9 has decreased.

On the other hand, in a step S314, the estimated NOx storage amount NOX is set to zero. This is because when the air fuel ratio is rich or at the stoichiometric air fuel ratio, the NOx stored in the rear catalyst 9 is rapidly reduced.

Therefore, by performing this routine, the NOx storage capacity CAPA of the rear catalyst 9 is detected based on the NOx concentration flowing out of the rear catalyst 9.

When the NOx storage capacity is less than the capacity CAPAth although it is immediately after SOx discharge control has terminated, it is determined that the rear catalyst 9 has permanently deteriorated and the flag FdiagNOX is set to 1. In other cases, the flag FdiagNOX is set to zero. Once the flag FdiagNOX is set to 1, it is not reset until the engine 1 has stopped running or the rear catalyst is replaced.

Apart from the detection of the NOx storage amount by this routine, the controller 6 also diagnoses the function of the rear catalyst 9 as a three-way catalyst by the method known in the art. When the three-way catalyst function has deteriorated below a predetermined level, the warning lamp 16 is lit to advise the driver to replace the catalyst.

In the step S312, nothing is done if conditions are not satisfied, but this is because the NOx storage capacity returns to the predetermined or a greater capacity if SOx discharge control is performed.

SOx discharge control is performed when the flag Fsox is set to 1. The flag Fsox may be set to 1 if Tsox is larger than Tsoxth in the step S312.

Further, the NOx storage amount NOX is computed here by accumulating the NOx trapping amount $\Delta$NOXa at a predetermined interval, but this may be simplified, for example by omitting the step S306 and treating $\Delta$NOX in the step S307 as a fixed value.

Figure 6:
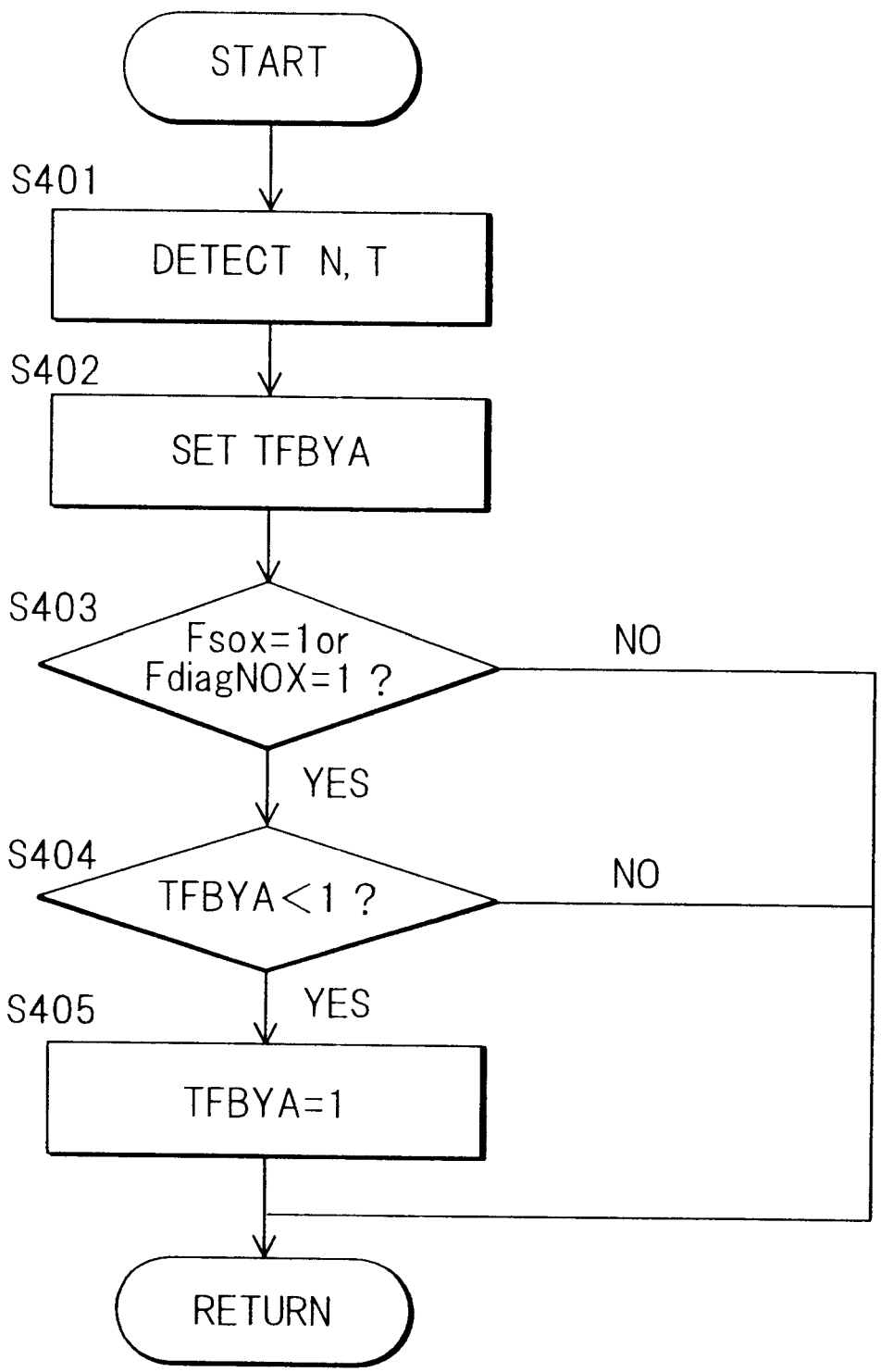
FIG. 6 shows a routine for setting the target air-fuel ratio.

FIG. 6 shows a routine for setting the target air fuel ratio. This routine is performed at a predetermined interval, for example 10 milliseconds, by the controller 6.

This routine sets the target air fuel ratio (target equivalence ratio) according to the running conditions. The target equivalence ratio TFBYA set here is used for computing a fuel injection amount in a routine described later, and as a representative value of the fuel ratio in various routines.

First, in a step S401, the engine rotation speed N is detected based on the occurrence interval of sensor 14. The engine load T is detected from the output of the accelerator position sensor 15.

In a step S402, the target equivalence ratio TFBYA is set according to the engine rotation speed N and engine load T by looking up a target equivalence ratio setting map shown in FIG. 4. Here, the target equivalence ratio TFBYA is the ratio of the stoichiometric air fuel ratio and target air fuel ratio (stoichiometric air fuel ratio/target air fuel ratio). When TFBYA is 1, the air fuel ratio is the stoichiometric air fuel ratio, when it is greater than 1, the air fuel ratio is rich, and when it is less than 1, the air fuel ratio is lean.

In a step S403, it is determined whether or not conditions for discharging SOx stored in the rear catalyst 9 are satisfied, or whether permanent deterioration of the rear catalyst 9 is established based on the flag Fsox and flag FdiagNOX, and if either of these situations occurs, the routine proceeds to a step S404.

In the step S404, it is determined whether or not the target equivalence ratio TFBYA is smaller than 1, and when TFBYA is less than 1, the routine proceeds to a step S405 and TFBYA is set to 1.

Therefore, by performing this routine, the target equivalence ratio TFBYA is set according to the running conditions. In a running region where TFBYA is set to less than 1, lean air fuel ratio running is normally performed, but when conditions for discharging SOx in the rear catalyst 9 are satisfied, or when permanent deterioration of the rear catalyst 9 is determined, the target equivalence ratio TFBYA is set to 1 to run at the stoichiometric air fuel ratio even if lean air fuel ratio running conditions are satisfied (prohibition of lean air fuel ratio running).

As described above, once the flag FdiagNOX is set to 1, it is not reset until the engine 1 stops running or until the rear catalyst 9 is replaced, so after permanent deterioration of the rear catalyst 9 is determined, prohibition of lean air fuel ratio running continues.

Figure 7:
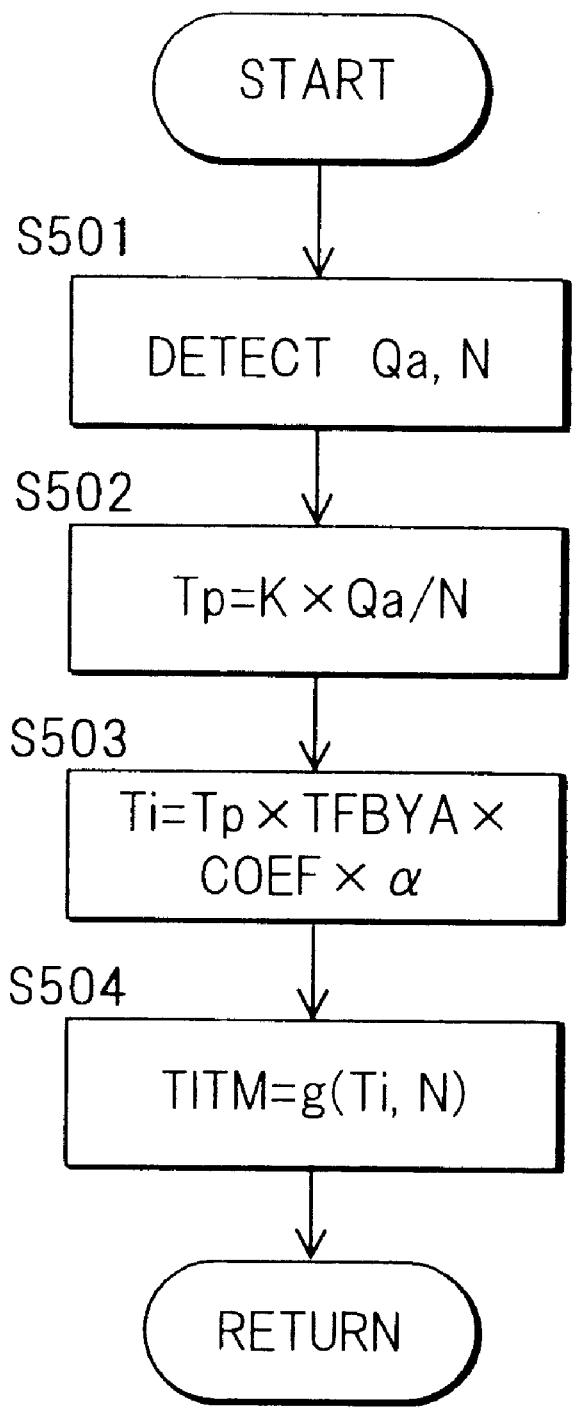
FIG. 7 shows a routine for setting a fuel injection amount and injection timing.

FIG. 7 shows a routine for computing the fuel injection amount and fuel injection timing. This routine is performed by the controller 6 at a predetermined interval, for example 10 milliseconds.

In the step S501, an intake air amount Qa is detected based on the output of the air flow meter 3. The engine rotation speed N is detected based on the occurrence interval of a predetermined signal from the crank angle sensor 14.

In the step S502, a basic fuel injection amount Tp, i.e., a fuel amount corresponding to the stoichiometric air fuel ratio, is computed based on the intake air amount Qa and the engine rotation speed N.

$$Tp = K \times Qa/N \qquad (4)$$

where K is a predetermined constant.

In a step S503, Tp is corrected by the target equivalence ratio TFBYA, a fuel increase correction coefficient COEF and a fuel ratio feedback coefficient $\alpha$, and a fuel injection amount Ti is computed by the following equation:

$$Ti = Tp \times TFBYA \times COEF \times \alpha \qquad (5)$$

The fuel increase correction coefficient COEF collectively represents a fuel increase correction coefficient after startup and a water temperature increase correction coefficient. The fuel increase correction coefficient COEF is larger than 1 until warmup of the engine 1 is complete, but after warmup of the engine 1 is completed, it is 1. Also, the fuel ratio feedback correction coefficient $\alpha$ is an air fuel ratio feedback correction coefficient when the target equivalence ratio TFBYA is set to 1 and the air fuel ratio is feedback controlled to the stoichiometric air fuel ratio. It is computed according to the output of the oxygen sensor 10.

In a step S504, a fuel injection timing TITM is computed based on the fuel ignition amount Ti and engine rotation speed N. The computed fuel injection amount Ti and fuel injection timing TITM are stored in the memory of the controller 6, and read and used in a fuel injection routine performed in synchronism with the rotation of the engine 1. For example, a signal is output to the injector 5 so that a fuel amount is injected obtained by adding an ineffectual injection amount Ts to the fuel injection amount Ti and a crank angle determined by the fuel injection timing TITM.

In this embodiment, stratified charge combustion is performed when running at a lean air-fuel ratio, and uniform charge combustion is performed when running at the stoichiometric air-fuel ratio or a rich air-fuel ratio. For this reason, when running at a lean air-fuel ratio, the fuel injection timing TITM is set in the compression stroke. When running at the stoichiometric air-fuel ratio or a rich air-fuel ratio, the fuel injection timing TITM is set in the intake stroke.

Next, the operation of the exhaust emission control device will be described when the controller 6 performs the above routine.

In the above exhaust emission control device, exhaust gas from the engine 1 is purified by the front catalyst 8 and rear catalyst 9. When the engine 1 is running at a lean air fuel ratio, NOx which could not the purified by the front catalyst 8 is trapped and stored by the rear catalyst 9. SOx in the exhaust gas is also trapped and stored by the rear catalyst 9.

However, if the SOx amount trapped and stored by the rear catalyst 9 increases, the NOx trapping capacity of the rear catalyst 9 decreases.

Hence, the controller 6 determines whether or not conditions for discharging SOx stored by the rear catalyst 9 are satisfied based on an estimated SOx storage amount (step S105). When conditions for discharging SOx are satisfied, SOx discharge control of the rear catalyst 9 is performed under predetermined conditions (step S205).

At this time, lean air fuel ratio running of the engine 1 is prohibited in the period from when SOx discharge conditions are satisfied to when SOx discharge control has terminated, i.e., until the NOx trapping capacity of the rear catalyst 9 has recovered (step S403).

The controller 6 also detects the NOx storage capacity of the rear catalyst 9 based on the output of the NOx sensor 12, i.e., the NOx concentration downstream of the rear catalyst 9. It then determines whether or not the rear catalyst 9 has permanently deteriorated based on this detection result. When it is determined that the rear catalyst 9 has permanently deteriorated, lean air fuel ratio running is prohibited, and SOx discharge control is prohibited (steps S204, S403).

Therefore, if the rear catalyst 9 has not permanently deteriorated, when the SOx storage amount of the rear catalyst 9 increases and SOx discharge conditions are satisfied, SOx discharge control is performed, but as lean air-fuel ratio running is prohibited from when SOx discharge conditions are satisfied to when SOx discharge is complete, lean air-fuel ratio running is prevented from being performed before the NOx trapping capacity of the rear catalyst 9 has recovered.

If lean air-fuel ratio running were performed when the rear catalyst 9 has permanently deteriorated, rich air-fuel ratio control would be frequently performed to recover the NOx trapping capacity of the rear catalyst 9 because the NOx storage capacity of the rear catalyst 9 is small. However, in this device, lean air-fuel ratio running is prohibited when it is determined that the rear catalyst has permanently deteriorated, so the rich air fuel ratio control can be prevented from taking place frequently.

When the rear catalyst 9 has permanently deteriorated due to heat deterioration, etc., NOx trapping capacity cannot be restored even if SOx discharge control is performed. In this situation, SOx discharge control is prohibited, so SOx discharge control is not performed needlessly, and impairment of fuel economy with increase of exhaust emissions is prevented.

The entire contents of Japanese Patent Application P11-73319 (filed Mar. 18, 1999) are incorporated herein by reference.

Although the invention has been described above by reference to a certain embodiment of the invention, the invention is not limited to the embodiment described above. Modifications and variations of the embodiments described above will occur to those skilled in the art, in light of the above teachings. The scope of the invention is defined with reference to the following claims.

What is claimed is:

1. An exhaust emission control device for an engine comprising:

an exhaust pipe, a catalyst provided in said exhaust pipe which traps and stores NOx in exhaust gas and reduces the stored NOx according to an air-fuel ratio of the exhaust gas flowing into said catalyst, a microprocessor programmed to:

determine whether or not conditions for discharging SOx stored in said catalyst are satisfied, raise the temperature of said catalyst to discharge SOx when SOx discharge conditions are satisfied and the running conditions of said engine are in a predetermined SOx discharge running region, and prohibit lean air fuel ratio running of said engine from when SOx discharge conditions are satisfied to when SOx discharge is complete, and a sensor which detects an NOx concentration downstream of said catalyst, and wherein said microprocessor is further programmed to:

detect an NOx storage capacity of said catalyst based on said detected NOx concentration, and prohibit lean air-fuel ratio running of said engine when an NOx storage capacity detected after SOx discharge is complete, is less than a predetermined capacity.

2. An exhaust emission control device as defined in claim 1, wherein said microprocessor is further programmed to prohibit SOx discharge control when said NOx storage capacity detected immediately after SOx discharge is complete is less than a predetermined amount.

* * * * *